W. W. McMAHAN.
TIRE BUILDING MACHINE.
APPLICATION FILED AUG. 7, 1915.

1,183,996.

Patented May 23, 1916.
3 SHEETS—SHEET 1.

Fig. 1.

WITNESS:
S. G. Taylor.

INVENTOR
William W. McMahan
BY
Ernest Hopkinson
HIS ATTORNEY

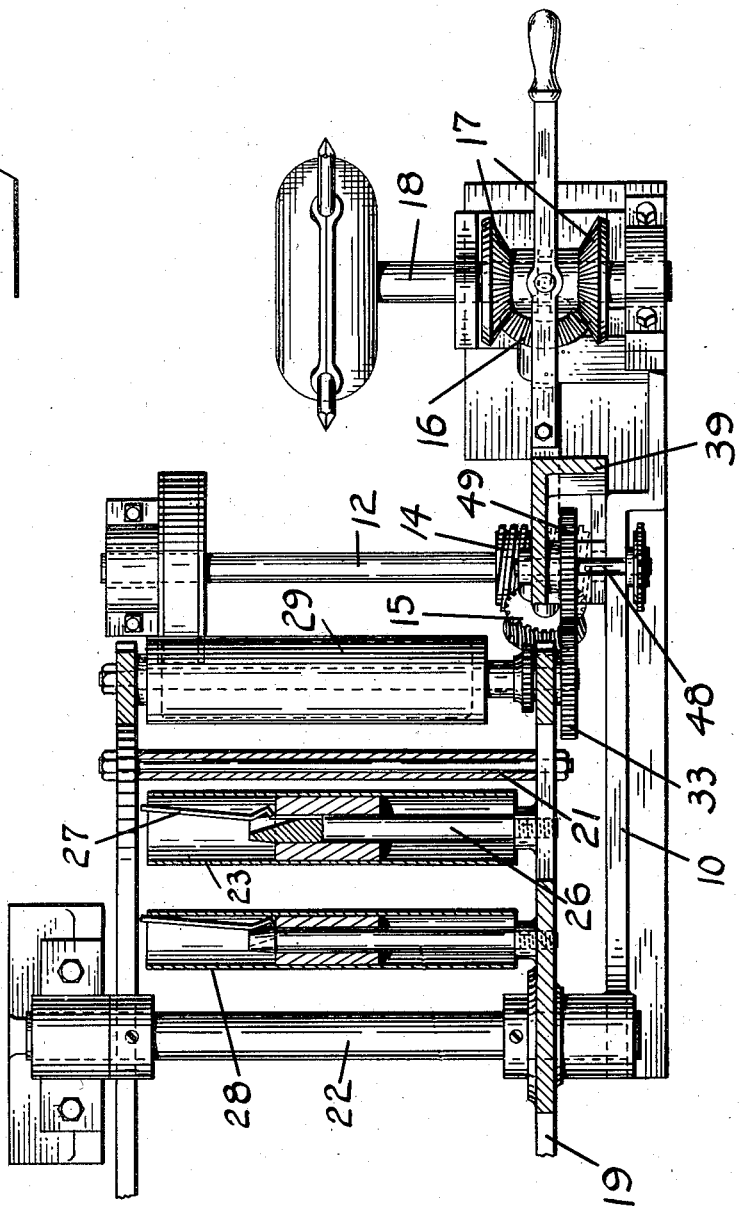

W. W. McMAHAN.
TIRE BUILDING MACHINE.
APPLICATION FILED AUG. 7, 1915.
1,183,996.
Patented May 23, 1916.
3 SHEETS—SHEET 3.
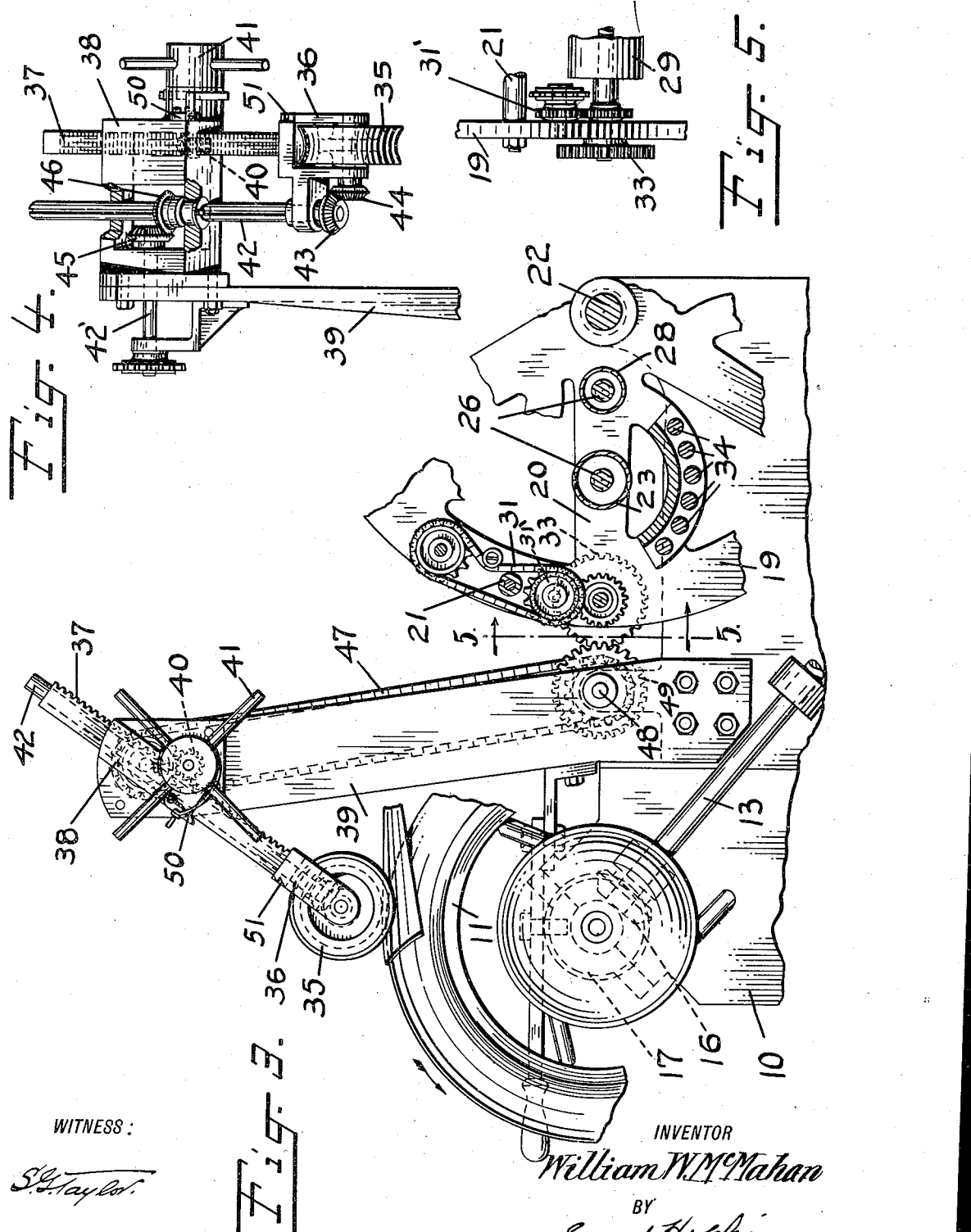
WITNESS:
S. G. Taylor.
INVENTOR
William W. McMahan
BY
Ernest Hopkinson
HIS ATTORNEY

UNITED STATES PATENT OFFICE.

WILLIAM W. McMAHAN, OF DETROIT, MICHIGAN, ASSIGNOR TO MORGAN & WRIGHT, A CORPORATION OF MICHIGAN.

TIRE-BUILDING MACHINE.

1,183,996.  Specification of Letters Patent.  Patented May 23, 1916.

Application filed August 7, 1915.  Serial No. 44,140.

*To all whom it may concern:*

Be it known that I, WILLIAM W. McMAHAN, a citizen of the United States, residing at Detroit, county of Wayne, State of Michigan, have invented certain new and useful Improvements in Tire-Building Machines, of which the following is a full, clear, and exact description.

This invention relates to tire building machines and has for an object to provide a machine embodying coacting mechanism whereby different widths of fabric corresponding to respective plies that make up the tire may be separately and uniformly stretched to a predetermined degree and laid with great speed and accuracy upon a ring core.

With the above objects in view, the invention consists in certain novel details of construction and combinations of parts hereinafter fully described and pointed out in the appended claims, it being understood that various modifications may be made without departing from the spirit or sacrificing any of the advantages of the invention.

The invention will be readily understood from the following description taken in connection with the accompanying drawing, in which—

Figure 1 is a side elevation of a tire building machine embodying my improvements with portions broken away; Fig. 2 is a sectional view on the line 2—2, Fig. 1; Fig. 3 is a fragmentary view, partly in elevation, and partly in section, showing the drive means for the feed rolls of one unit; Fig. 4 is a fragmentary detail elevation of the friction wheel and its mountings; Fig. 5 is a detail sectional view on the line 5—5, Fig. 3.

Referring now to the drawings, 10 designates the frame of the machine and mounted for rotation on the frame is a ring core 11 of the general configuration of the tire to be formed. A main drive shaft 12 is journaled in the frame and drives the core 11 through the instrumentality of an obliquely disposed shaft 13, which has a worm and gear connection 14—15 with the main drive shaft and a bevel gear connection 16—17 with the core shaft 18. Mounted for step rotation in the plane of the core is a turret indicated in general by the numeral 19, the same preferably comprising annular spoked sides 20 connected at intervals by spacing bolts 21. The turret turns freely on a shaft 22, and carries a plurality of stock rolls for respective different widths of fabric that make up corresponding plies of the tire, and respective feed rolls in unit association therewith, as shown at A—B—C, and as these units are duplicates of each other, a full complement has not been shown, and a description of one unit will suffice for all. Each unit comprises a roll 23 upon which is wound the rubber treated bias fabric strip 24 from which a corresponding ply of the tire is to be made, together with a liner strip 25 which keeps the convolutions of fabric from sticking together while on the roll. The roll is mounted on a stub shaft 26 that is journaled in one of the spokes of the turret, and is removably secured to the shaft by means of a spring latch 27. The liner strip comes off the roll with the fabric strip, and is spooled on a take-up roll 28, the fabric strip backed by the liner strip being drawn over the take-up roll and rotating the latter by frictional engagement therewith to wind up the liner strip.

The rubber treated fabric 24, freed from the liner strip, is fed to the core by a pair of feed rolls 29 and 30 spaced apart a distance greater than the running length of the thread in the fabric, so that both will not operate upon the same thread simultaneously. Both the feed rolls in the present embodiment are connected for rotation at the same axle speed by a chain drive 31, but the roller 30, which will be hereinafter termed the delivery roller, is formed of larger diameter than the roller 29, which will be hereinafter termed the stretching roller, so that a stretch of about 14% occurs in the fabric while passing between these rollers. Since the ratio of surface speeds of the delivery roller and stretching roller determine the amount of stretch in the fabric, the surface speeds may be controlled by making the rollers of equal diameter, but connecting together by a reduction drive. The stretching roll forms the drive roll and for this purpose its shaft 32 is geared to the chain drive as shown at 31', and is extended beyond the side of the turret and there equipped with a gear 33, adapted to be driven by mechanism hereinafter described as the unit comes opposite the point where the fabric is to be used. On the way to the stretching roll, the fabric strip passes over an arcuate guide member, designated in general by the numeral 34, and is held taut thereby.

For the purpose of regulating the stretch in the fabric, so that the stretch of the outer plies will not be more than the inner ones, owing to the increased diameter of successive plies, the feed rolls are driven by a friction wheel 35 which is faced with rubber or other yielding material and is positioned to contact with the fabric as the latter arrives at the core. The wheel turns freely in the forked end 36 of a rack 37 which is supported in a suitable guide 38 positioned above the core and between the core and the turret by means of an arm 39, that rises from the frame 10 of the machine. The rack is moved to raise and lower the drive wheel substantially tangentially to the core by means of a pinion 40 and hand wheel 41. A stub 42' is journaled in the arm 39 and is driven by the drive wheel through the instrumentality of a shaft 42 which has a bevel gear connection 43—44, with the shaft of the drive wheel, and has a bevel gear connection 45—46 with the shaft 42', the bevel gear 46 being feathered on the shaft 42 to permit raising and lowering of the friction wheel. The shaft 42' is connected by a chain drive 47 to a shaft 48, which is journaled in the frame 10 of the machine and upon which is secured a gear 49 that is adapted to mesh with the above described driving gears 33 of the various units A—C at successive step movements of the turret.

The turret is locked stationary while the fabric of any unit is being wound on to the core, and in the present embodiment, for the purpose of simplicity, I have shown the locking means as a pin 19' passing through the frame 10 and openings 19'' in the side of the turret.

In operation the friction wheel is raised and locked in released position by spring dog 50 which engages a notch 51 in the rack. The free end of the fabric is then pressed down on the surface of the core to which it adheres, then the dog is released to permit the friction wheel to gravitate and bear upon the fabric as shown. The core is then rotated and draws a round of the fabric on to its surface, the fabric being stretched as it passes between the feed rolls to conform readily to the rounded surface of the core. After this ply of fabric has been completed the core is stopped, the fabric is severed from the supply, and a lap joint is made. The margins of the ply are then pressed to the configuration of the sides of the core in the usual manner. The turret is now moved up one step and positions the next succeeding unit with the material for the next ply in position to supply its fabric to the core. The above described operation is then repeated until the required number of plies of fabric have been superposed upon the core.

What is claimed is:

1. A tire building machine embodying a revoluble core, a fabric supply roll, feed rolls revoluble at a predetermined ratio of surface speeds for imparting a stretch to the fabric, a friction wheel driven from the fabric as it arrives at the core, means for effecting a sliding movement of the friction wheel substantially tangentially toward and away from the core, and a positive drive connecting the friction wheel and feed rolls.

2. A tire building machine embodying a revoluble core, a fabric supply roll, feed rolls revoluble at a predetermined ratio of surface speeds for imparting a stretch to the fabric, a friction wheel driven from the fabric as it arrives at the core, a stationary guide, a rack and pinion thereon for moving the friction wheel substantially tangentially with respect to the core, and a positive drive connecting the friction wheel and feed rolls.

3. A tire building machine embodying a revoluble core, a fabric supply roll, feed rolls revoluble at a predetermined ratio of surface speeds for imparting a stretch to the fabric, a friction wheel driven from the fabric as it arrives at the core, a rack carrying the friction wheel, a guide supporting the rack for movement substantially tangentially with respect to the core, a pinion carried by the guide for moving the rack, a shaft carried by the rack and driven by the friction wheel, a shaft carried by the guide and driven by the first named shaft, and a positive drive connecting the last named shaft and the feed rolls.

Signed at Detroit, Mich., July 29th, 1915.

WILLIAM W. McMAHAN.